(No Model.)
G. E. SMOUSE.
NUT LOCK.
No. 529,970. Patented Nov. 27, 1894.
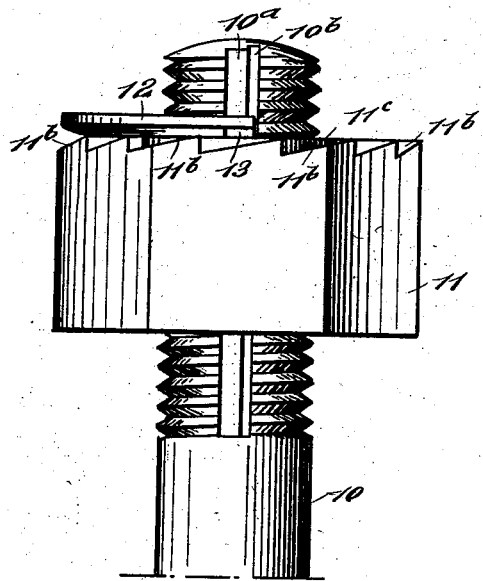
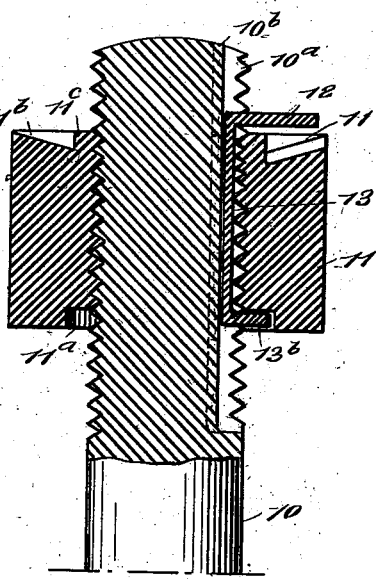
Fig. 1     Fig. 2
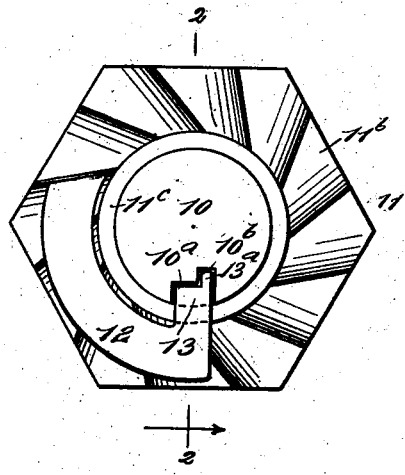
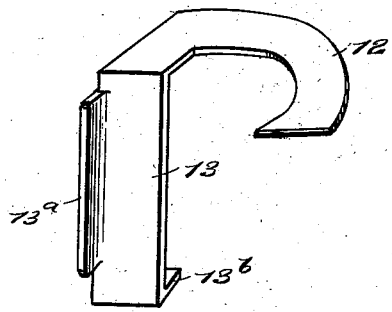
Fig. 3     Fig. 4
WITNESSES:
Joshua Bergstrom
Wm P. Patton
INVENTOR
G. E. Smouse
BY Munn & Co
ATTORNEYS.

UNITED STATES PATENT OFFICE.

GEORGE ELLIS SMOUSE, OF EVERETT, PENNSYLVANIA.

NUT-LOCK.

SPECIFICATION forming part of Letters Patent No. 529,970, dated November 27, 1894.

Application filed September 25, 1894. Serial No. 524,070. (No model.)

*To all whom it may concern:*

Be it known that I, GEORGE ELLIS SMOUSE, of Everett, in the county of Bedford and State of Pennsylvania, have invented a new and Improved Nut-Lock, of which the following is a full, clear, and exact description.

My invention relates to an improved nut lock of a type employing a key and ratchet to adjustably hold the nut from unscrewing, and has for its objects to provide certain novel and simple details of construction for such a device, whereby facility in application of the nut to the threaded body of the bolt is afforded, and a reliable locking of said nut from recession is effected.

To these ends my invention consists in the construction and combination of parts as is hereinafter described and claimed.

Reference is to be had to the accompanying drawings, forming a part of this specification, in which similar figures of reference indicate corresponding parts in all the views shown.

Figure 1 is a side view of a bolt, a nut thereon, and the improvement applied to retain the nut from unscrewing. Fig. 2 is a sectional side view of the bolt and nut taken through the longitudinal axis, and also of the nut lock, on the line 2—2 in Fig. 3. Fig. 3 is an outer end view of a nut, a screw bolt body engaged by the nut and the improved nut lock engaging the bolt and nut; and Fig. 4 is a detached perspective view of the locking pawl and a key integral therewith.

The threaded bolt 10 may be of any length and diameter required for its service, the nut 11 that is to engage therewith having such corresponding dimensions in its body and threaded aperture, as will adapt it to properly fit on the threaded portion of the bolt when screwed on the same.

The bolt 10 is longitudinally grooved to produce a flat bottomed key way $10^a$, that is of such a depth as will remove the threads of the bolt wherein this longitudinal groove or key-way is produced. Along one side of the key-way $10^a$ a narrow deeper channel $10^b$ is formed throughout the length of said keyway, the combined widths of these key-ways being proportioned to the dimensions of the bolt and nut so as to receive a locking device of proper size.

The nut 11 may be square or polygonal in contour, the usual hexagonally formed nut being shown to illustrate the application of the improvement. There is a countersunk depression $11^a$ produced around the threaded wall of the nut 11, on the side that will impinge the material to be clamped by the nut when the bolt and nut are applied for such purpose.

On the opposite side of the nut, which is outermost in service, a series of ratchet teeth $11^b$ is formed. These teeth that all slope in the same direction, are preferably produced tangential to the circular wall of the threaded perforation in the nut. As shown in Fig. 2, the teeth of the ratchet formation are produced by indentations or excavations of the material between them, which cavities are gradually increased in depth toward the threaded aperture of the nut, and terminate at the outer wall of the annular integral upright collar $11^c$ which encircles the bolt thread when the nut is in place on the latter.

The locking device for the nut and bolt, comprises a spring pawl 12 and an integral key 13. As shown plainly in Fig. 4, the pawl is formed from a thin elastic plate, which is curved edgewise and also sidewise, so as to produce a spring detent that will be adapted for location over the teeth on a portion of the serrated side of the nut, and permit its free downwardly curved end to engage with one of the teeth, as shown in Figs. 1 and 3.

The key portion 13 of the locking device, is constructed integral with the spring pawl 12, and is so projected therefrom at one end that it may be entered in the key-way of the bolt, and as represented in Fig. 4 there is an integral tongue or key flange $13^a$, formed along one edge of the wider thin flat key portion 13 at right angles thereto, which flange is so projected from the wider part of the key, that it will have a loose engagement with the narrow key-way $10^b$ in the bolt body when the locking device is applied to the bolt and nut. Such a relative width and thickness is given to the key body 13 that it will loosely occupy the wide shallow key way $10^a$ when the nut lock is in service, the flanged projection $13^a$ then having a loose engagement with the channel $10^b$, as before explained. The part 13 is proportioned in length to suit the thickness of the nut between its annularly channeled side and opposite serrated side, and as shown there is a lateral lip 13$^b$ turned on the end of said key body which is farthest from the detent pawl, in a direction which will allow it to lie in the channel 11$^a$ of the nut when the locking device is placed for service, such an engagement being represented in Fig. 2.

It will be seen, that if the key body 13 is placed in the nut so as to engage its lip with the channel 11$^a$ and have a loose contact with the thread of the nut, the integral spring pawl 12 will be so relatively positioned, that it will engage its toe with the ratchet teeth 11$^b$, said teeth being inclined in a proper direction to permit them to slide over the toe of the pawl when the nut is screwed on the bolt, and interlock with the pawl when a reverse rotation that would unscrew the nut is attempted.

The provision of the flange 13$^a$, is of advantage to afford an assured engagement of the key with the bolt when the thread is shallow and the key body is thin, the formation of the locking device 12, 13, from sheet metal being permitted by its peculiar construction.

By gradually depressing the indentations between ratchet teeth 11$^b$ as they approach the annular collar 11$^c$, the inward slope thus given to these cavities adapts them to crowd the toe of the spring pawl 12 toward the collar mentioned and assure an engagement of the pawl and teeth, the collar serving to prevent an engagement of the pawl toe with the thread of the bolt, which if permitted would result in the elevation of said toe from the ratchet teeth as the nut is being rotated to screw it on the bolt.

The toe of the spring pawl 12, is shaped on its terminal edges so that it will have a bearing on any one of the tangentially inclined teeth 11$^b$, throughout the length of the latter, which will co-act with the gradual deepening of the teeth to cause the toe of the pawl to press toward the collar 11$^c$ if the nut is frictionally moved on a bolt. This feature of construction assures the proper action at all times of the thin spring pawl, and a maintenance of locked engagement of its toe with the teeth on the nut.

Having thus described my invention, I claim as new and desire to secure by Letters Patent—

1. In a nut lock of the key and ratchet type, the combination, with a bolt grooved in its thread, and a nut having locking projections on top, of a spring pawl having an integral depending key, and a key flange formed at right angles on said key along one edge, substantially as described.

2. In a nut lock of the key and ratchet type, the combination with a threaded bolt longitudinally grooved producing a flat bottomed shallow key-way and a narrow deeper key-way at one side in the shallow key-way, and a threaded nut having ratchet teeth on one end, of a locking pawl having a laterally flanged depending key, which key and its flange are adapted to engage with the key-ways in the bolt, and hold the toe of the pawl engaged with the ratchet teeth, substantially as described.

3. In a nut lock of the key and ratchet type, the combination with a threaded bolt longitudinally grooved, producing a key-way, and a nut having a series of ratchet teeth formed in one end deepening toward their inner terminals, and an integral collar into which said teeth merge at their inner ends, of a spring pawl bent to engage its toe with the ratchet teeth, and having a depending key loosely secured in the nut and engaging the key-way to hold the pawl toe in contact with the ratchet teeth, substantially as described.

4. In a nut lock of the key and ratchet type, the nut having a continuous series of tangential ratchet teeth formed in one end, said teeth being sloped in intervening cavities to gradually deepen them toward their inner terminals which merge in an annular collar encircling the threaded aperture of the nut, substantially as described.

GEORGE ELLIS SMOUSE.

Witnesses:
J. F. REED,
JACOB REED.